United States Patent
Lin (12)

(10) Patent No.: US 9,814,020 B2
(45) Date of Patent: Nov. 7, 2017

(54) METHOD OF TRANSMITTING RRC MESSAGES IN RRC-IDLE MODE

(71) Applicant: ACER INCORPORATED, New Taipei (TW)

(72) Inventor: Miao-Er Lin, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 178 days.

(21) Appl. No.: 14/571,308

(22) Filed: Dec. 16, 2014

(65) Prior Publication Data

US 2015/0230204 A1   Aug. 13, 2015

Related U.S. Application Data

(60) Provisional application No. 61/938,702, filed on Feb. 12, 2014.

(30) Foreign Application Priority Data

Jul. 24, 2014   (TW) .............................. 103125326 A

(51) Int. Cl.
*H04W 72/00* (2009.01)
*H04W 76/02* (2009.01)
*H04W 74/08* (2009.01)
*H04W 74/00* (2009.01)

(52) U.S. Cl.
CPC ....... *H04W 72/005* (2013.01); *H04W 74/002* (2013.01); *H04W 74/0833* (2013.01); *H04W 76/02* (2013.01)

(58) Field of Classification Search
CPC ........... H04W 74/0833; H04W 74/002; H04W 74/004; H04W 74/006; H04W 74/0866; H04W 72/042; H04W 72/005; H04W 76/02; H04W 76/046; H04L 1/1812; H04L 5/0053; H04L 5/0048; H04L 29/06163

See application file for complete search history.

(56) References Cited

U.S. PATENT DOCUMENTS

| 2006/0094408 A1 | 5/2006 | Hu |
| 2008/0273482 A1 | 11/2008 | Lee |
| 2009/0259910 A1* | 10/2009 | Lee ....................... H04L 1/1822 714/748 |
| 2010/0195522 A1* | 8/2010 | Lee ..................... H04W 72/005 370/252 |
| 2011/0305183 A1 | 12/2011 | Hsu |

(Continued)

FOREIGN PATENT DOCUMENTS

CN   102440066 A   5/2012

OTHER PUBLICATIONS

Ericsson et al, Counting for MBMS Rel-10, 3GPP TSG-RAN WG2 #70, Jun. 28-Jul. 2, 2010, pp. 1-3, R2-103865, XP050451268, Stockholm, Sweden.

*Primary Examiner* — Yemane Mesfin
*Assistant Examiner* — Peter Chen
(74) *Attorney, Agent, or Firm* — Winston Hsu

(57) ABSTRACT

In a wireless communication system, different preambles are provided for transmitting RRC messages in the RRC-connected mode and in the RRC-idle mode. When a user equipment operating in the RRC-idle mode is required to transmit a single RRC message, the single-transmission preamble is used for transmitting the single RRC message without establishing an RRC connection.

9 Claims, 4 Drawing Sheets

(56) References Cited

U.S. PATENT DOCUMENTS

| | | |
|---|---|---|
| 2012/0026929 A1 | 2/2012 | Wang |
| 2012/0077507 A1 | 3/2012 | Lee |
| 2012/0147830 A1* | 6/2012 | Lohr ............... H04W 72/042 370/329 |
| 2012/0163311 A1 | 6/2012 | Park |
| 2012/0202493 A1 | 8/2012 | Wang |
| 2013/0107784 A1* | 5/2013 | Chang ............. H04W 72/005 370/312 |
| 2013/0142072 A1 | 6/2013 | Xu |
| 2013/0272294 A1 | 10/2013 | Mildh |
| 2013/0294325 A1 | 11/2013 | Lee |
| 2015/0085689 A1* | 3/2015 | Vos .................. H04W 4/005 370/252 |
| 2015/0257173 A1 | 9/2015 | You |

\* cited by examiner

METHOD OF TRANSMITTING RRC MESSAGES IN RRC-IDLE MODE

CROSS REFERENCE TO RELATED APPLICATIONS

This application claims the benefit of U.S. provisional application No. 61/938,702 filed on 2014 Feb. 12.

BACKGROUND OF THE INVENTION

1. Field of the Invention

The present invention is related to a method of transmitting RRC messages, and more particularly, to a method of transmitting RRC messages in the RRC-idle mode.

2. Description of the Prior Art

The 3rd Generation Partnership Project (3GPP) has developed a universal mobile telecommunications system (UMTS) which adopts a wideband code division multiple access (WCDMA) technology capable of providing high frequency spectrum utilization, universal coverage, and high-speed/quality multimedia data transmission. In the UMTS, a radio access network known as a universal terrestrial radio access network (UTRAN) includes multiple base stations, commonly known as Node-Bs (NBs), for communicating with multiple user equipment (UE). Furthermore, a long-term evolution (LTE) system is now being developed by the 3GPP in order to further improve performance of the UMTS to satisfy users' increasing needs. The LTE system includes a new radio interface and radio network architecture which provides a high data rate, low latency, packet optimization, and improved system capacity and coverage. In the LTE system, a radio access network known as an evolved UTRAN (E-UTRAN) includes multiple evolved NBs (eNBs) for communicating with multiple UEs. LTE radio interface protocols include an access stratum (AS) layer and a non-access stratum (NAS) layer. The AS layer includes a physical layer (L1), a data link layer (L2) and a network layer (L3). The network layer controls a radio resource control (RRC layer). The data link layer includes a packet data convergence protocol (PDCP), a radio link control (RLC) and a medium access control (MAC). The NAS layer handles the communication between the UE and the core network (CN) which includes a mobility management entity (MME), a serving gateway and other devices.

Multimedia Broadcast Multicast Service (MBMS) is a Point-to-Multipoint (PTM) interface specification designed to provide efficient delivery of broadcast and multicast services within 3GPP cellular networks. Examples of MBMS interface specifications include those described in UMTS and LTE communication specifications. For broadcast transmission across multiple cells, the specifications define transmission over single-frequency network configurations. Intended applications include mobile TV, news, radio broadcasting, file delivery, emergency alerts, and others. When services are broadcasted by MBMS, all cells inside a multimedia broadcast multicast service single frequency network (MBSFN) area transmit the same MBMS service.

In order to acquire the amount of UEs which are using or interested in MBMS services, the base station is configured to initiate a counting procedure by sending a CountingRequest message. According to related 3GPP specifications, a UE can receive MBMS contents when operating in a radio resource control (RRC)-connected mode or an RRC-idle mode. However, only the UE operating in the RRC-connected mode is able to reply the CountingRequest message sent by the base station. In order for the UE operating in the RRC-idle mode to reply the CountingRequest message, the UE is required to perform a contention-based random access procedure for requesting an RRC connection. Therefore, in the prior art method of transmitting RRC messages when the UE operating in the RRC-idle mode only needs to send a single RRC message, many resources are required in order to establish an RRC connection between the base station and the UE, thereby influencing network efficiency.

SUMMARY OF THE INVENTION

The present invention provides a method of transmitting RRC messages in an RRC-idle mode. The method includes providing at least one single transmission preamble for use in a wireless communication system which includes a base station and a user equipment; the user equipment transmitting the at least one single transmission preamble to the base station when the user equipment operating in the RRC-idle mode is required to send an RRC message without establishing an RRC connection; the base station transmitting a random access response message to the user equipment; and the user equipment transmitting the RRC message to the base station according to the random access response message without establishing the RRC connection.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
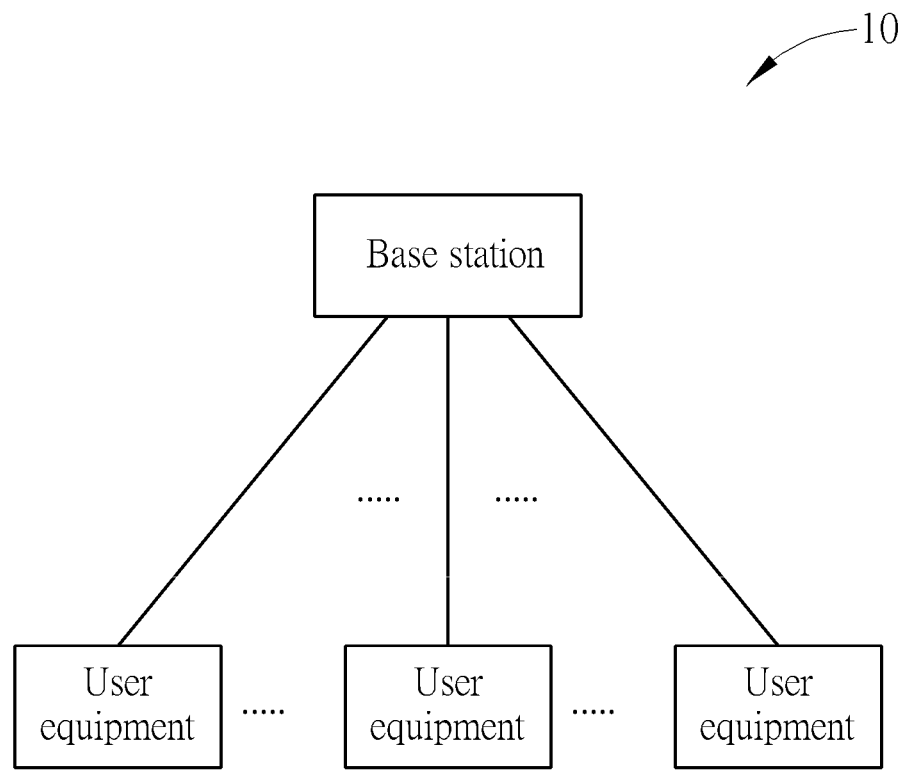
FIG. 1 is a diagram illustrating a wireless communication system according to an embodiment of the present invention.

FIG. 1 is a diagram illustrating a wireless communication system 10 according to an embodiment of the present invention. The wireless communication system 10, including a base station and multiple UEs, may preferably be an LTE system or another network system which supports multiple components carriers. In the LTE system, the base station may be an eNB of the EUTRAN. Each UE may include electronic devices, such as mobile telephones, personal digital assistants, handheld, tablet, nettop, or laptop computers, or other devices with similar telecommunication capabilities. However, the types of the base station and the UEs do not limit the scope of the present invention. Also, the base station and each UE may either be a transmitter or a receiver. For uplink (UL) transmissions, the UEs are transmitters and the base station is a receiver for. For downlink (DL) transmissions, the base station is a transmitter and the UEs are receivers.

Figure 2:
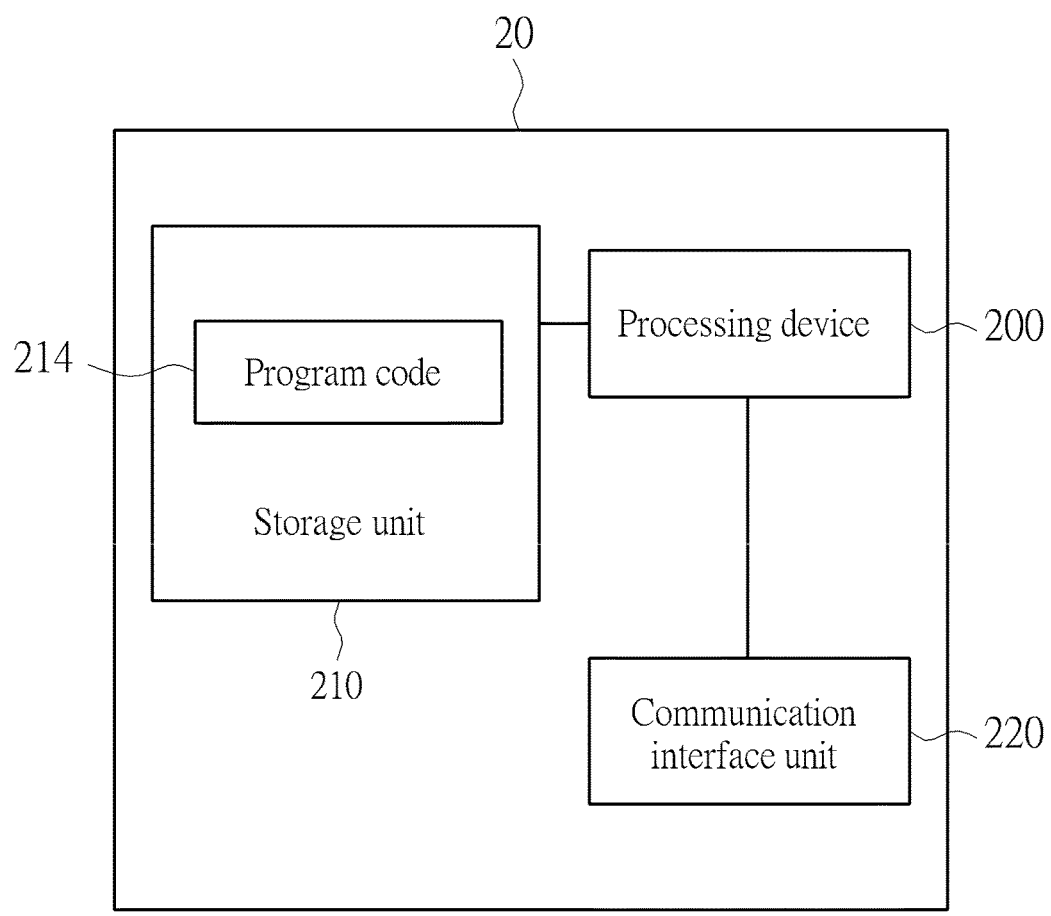
FIG. 2 is a diagram illustrating a communication device according to an embodiment of the present invention.

FIG. 2 is a diagram illustrating a communication device 20 according to an embodiment of the present invention. The communication device 20, which may be the UE or the base station depicted in FIG. 1, includes a processing device 200, a storage unit 210 and a communication interface unit 220. The processing device 200 may be a microprocessor or an application-specific integrated circuit (ASIC). The storage unit 210 may be any data storage device capable of storing a program code 214 which may be accessed and executed by the processing device 200. For example, the storage unit 210 may be a subscriber identity module (SIM) card, read-only memory (ROM), random-access memory (RAM), a CD-ROM, a magnetic tape, a floppy disk, or an optical data storage device. The communication interface unit 220 may be a wireless transceiver configured to communicate with other devices wirelessly and convert the computation result of the processing device 200 into wireless signals.

Figure 3:
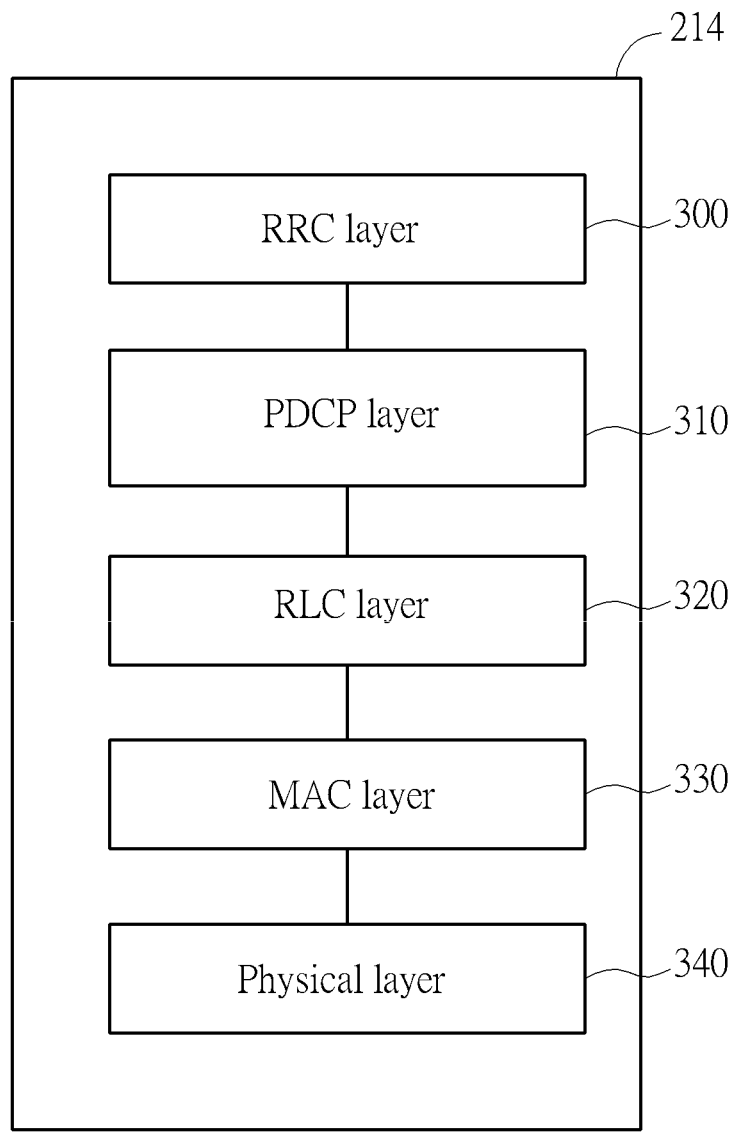
FIG. 3 is a diagram illustrating a program code applied to an LTE system according to an embodiment of the present invention.

FIG. 3 is a diagram illustrating the program code 214 applied to the LTE system according to an embodiment of the present invention. The program code 214 includes codes associated with a plurality of communication protocol layers which are, from top to bottom, an RRC layer 300, a PDCP layer 310, an RLC layer 320, a MAC layer 330, and a physical layer 340. The physical layer 340 includes a plurality of physical channels, such as a physical random access channel (PRACH), a physical uplink control channel (PUCCH), a physical uplink shared channel (PUSCH), a physical downlink control channel (PDCCH) and a physical downlink shared channel (PDSCH), etc.

Figure 4:
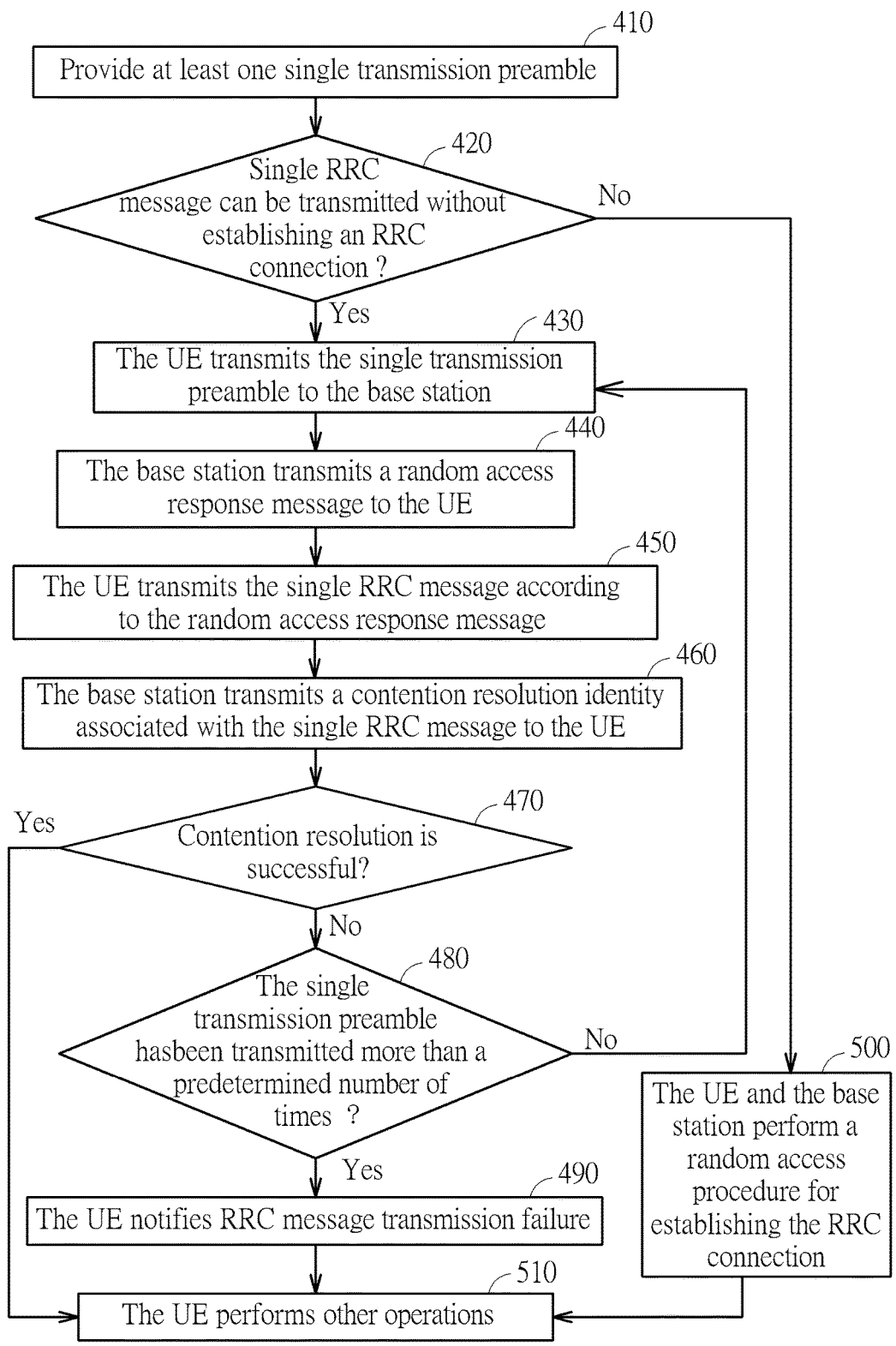
FIG. 4 is a flowchart illustrating a method of transmitting RRC messages in the RRC-idle mode according to an embodiment of the present invention.

FIG. 4 is a flowchart illustrating a method of transmitting RRC messages in the RRC-idle mode according to an embodiment of the present invention. The program code 214 may be installed in the based station and the UE for executing the following steps:

Step 410: provide at least one single transmission preamble; execute step 420.

Step 420: determine if a single RRC message can be transmitted without establishing an RRC connection when the UE operating in the RRC-idle mode is required to send the single RRC message; if yes, execute step 430; if no, execute step 500.

Step 430: the UE transmits the single transmission preamble to the base station; execute step 440.

Step 440: the base station transmits a random access response message to the UE; execute step 450.

Step 450: the UE transmits the single RRC message according to the random access response message; execute step 460.

Step 460: the base station transmits a contention resolution identity associated with the single RRC message to the UE; execute step 470.

Step 470: the UE determines if a contention resolution is successful; if yes, execute step 510; if no, execute step 480.

Step 480: the UE determines if the single transmission preamble has been transmitted more than a predetermined number of times; if yes, execute step 490; if no, execute step 430.

Step 490: the UE notifies RRC message transmission failure; execute step 510.

Step 500: the UE and the base station perform a random access procedure for establishing the RRC connection; execute step 510.

Step 510: the UE performs other operations.

According to current 3GPP specifications, an LTE base station may broadcast the information which does not change frequently, the information which is commonly used or shared information to all UEs within its service range. This information includes a master information block (MIB) and various types of system information block (SIB). The system information block type 2 (SIB2) mainly includes common radio resource configuration information (radioResourceConfigCommon), timer and constants (ue-TimersAndConstants) and frequency information (freqInfo). The common radio resource configuration information is associated with resource allocation, resource management and power control information of uplink channels including PRACH, PUCCH and PUSCH, the sounding reference signal (SRS), and downlink channels including broadcast control channel (BCCH), PDSCH and PDCCH.

According to the common radio resource configuration information of SIB2, there are 64 preambles which are reserved for random accesses and may be allocated to contention-based random accesses or non-contention-based random accesses. A contention-based random access can use two preamble groups, wherein a preamble group A is for long messages and a preamble group B is for short messages. A "numberOfRA-Preambles" parameter is for designating the number of preambles used for contention-based random accesses. A "sizeOfRA-PreamblesGroupA" parameter is for designating the size of the preamble group A. A "messageSizeGroupA" parameter is a threshold for determining the message size. A message of a size larger than the threshold is considered to be a long message.

In addition to the existing preamble groups A and B, one or multiple preamble groups each including one or multiple single transmission preambles are provided in step 410 for use in the transmission of the single RRC message in the RRC-idle mode. In an embodiment, the base station may broadcast parameters associated with a preamble group C via SIB2, thereby designating the number of preambles for use in contention-based random accesses. All RRC messages to be transmitted in the RRC-idle mode may use any of the single transmission preambles in the preamble group C. In another embodiment, the base station may broadcast parameters associated with a preamble group C and a preamble group D via SIB2, thereby designating the number of preambles for use in contention-based random accesses, designating the size of the preamble group C and determining the size of the RRC messages. All short RRC messages to be transmitted in the RRC-idle mode may use any of the single transmission preambles in the preamble group C, while all long RRC messages to be transmitted in the RRC-idle mode may use any of the single transmission preambles in the preamble group D. In other words, the existing preamble groups A and B are used for the bi-directional communication between the UE and the base station, while the preamble groups C and D according to the present invention are used for the uni-directional communication from the UE to the base station.

When the UE is operating in the RRC-idle mode, a bi-directional communication between the UE and the base station may be requested in order to perform specific procedures which include, but not limited to, tracking area update or data transmission. Under such circumstance, it may be determined in step 420 that the RRC connection needs to be established so that the UE can send RRC messages in the RRC-connected mode, and step 500 may then be executed for performing the random access procedure. In the current random access procedure, all short RRC messages to be transmitted in the RRC-connected mode may use any of the preambles in the preamble group A, while all long RRC messages to be transmitted in the RRC-connected mode may use any of the preambles in the preamble group B. Detailed steps of performing the random access procedure have been described in related 3GPP specifications.

When the UE operating in the RRC-idle mode receives an MBMS counting request message, the UE only needs to send a single RRC message. Under such circumstance, it may be determined in step 420 that there is no need to establish the RRC connection, and steps 430-490 may then be executed.

In step 430, the UE may select a single transmission preamble from the preamble group C and send the selected single transmission preamble to the base station for a short RRC message to be transmitted in the RRC-idle mode. Or, the UE may select a single transmission preamble from the preamble group D and send the selected single transmission preamble to the base station for a long RRC message to be transmitted in the RRC-idle mode. In another embodiment, the UE may select a single transmission preamble from the preamble group C and send the selected single transmission preamble to the base station for any RRC message to be transmitted in the RRC-idle mode In step 440, the base station is configured to transmit the random access response message to the UE. The random access response message includes a modulation and coding scheme (MCS) which is allocated to the UE based on single transmission preambles and a temporary cell radio network temporary identifier (C-RNTI) which is before a successful contention resolution is verified.

In step 450, the UE can acquire the temporary C-RNTI assigned by the base station after receiving the random access response message, thereby transmitting the single RRC message to the base station. The single RRC message may be, but not limited to, a counting reply message associated with an MBMS counting procedure.

In step 460, the base station is configured to transmit the contention resolution identity associated with the single RRC message to the UE. For example, the base station may fetch the first 48 bits of the single RRC message as the contention resolution identity and then transmit the contention resolution identity via the PDCCH masked with the temporary C-RNTI.

The number of UEs in a macrocell (normally several hundreds) is much larger than the number of available single transmission preambles. If a first UE and a second UE both send the same specific single transmission preamble simultaneously, a specific base station only sends a random access response message in response to the same specific single transmission preamble. Therefore, the same temporary C-RNTI is assigned to both the first UE and the second UE for monitoring the PDCCH masked with the temporary C-RNTI. When receiving the same contention resolution identity, each of the first UE and the second UE is configured to compare the received contention resolution identity with its previously sent single RRC message. If the contention resolution identity sent by the base station in step 460 is associated with the single RRC message sent by the first UE in step 450, only the first UE is able to verify a successful contention resolution in step 470 and then performs other operations in step 510. On the other hand, the second UE is unable to verify a successful contention resolution in step 470 and step 480 is then executed.

According to the common radio resource configuration information of SIB2, a "preambleTransMax" parameter is used for designated the maximum allowable preamble retransmission times. If it is determined in step 480 that the single transmission preamble has not been transmitted more than the maximum allowable preamble retransmission times, steps 430-470 are again executed. If it is determined in step 480 that the single transmission preamble has been transmitted more than the maximum allowable preamble retransmission times, step 490 is then executed for notifying RRC message transmission failure.

Steps 430-470 of the present method are associated with the random access procedure which is performed for transmitting an RRC message in the RRC-idle mode. Compared to the prior art random access procedure, the present method occupies fewer radio resources since no RRC connection needs to be established for transmitting a single RRC message in the RRC-idle mode. The present invention can improve system efficiency by preventing an RRC connection from being established only for transmitting a single RRC message.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of transmitting (radio resource control) RRC messages in an RRC-idle mode, comprising:
   providing at least one single transmission preamble for use in a wireless communication system which includes a base station and a user equipment, wherein the least one single transmission preamble is selected from a first preamble group which includes a plurality of single transmission preambles for transmitting a first long RRC message in the RRC-idle mode, or is selected from a second preamble group which includes a plurality of single transmission preambles for transmitting a first short RRC message in the RRC-idle mode;
   providing a third preamble group for transmitting a second long RRC message in an RRC-connected mode;
   providing a fourth preamble group for transmitting a second short RRC message in the RRC-connected mode;
   the user equipment transmitting the at least one single transmission preamble to the base station when the user equipment operating in the RRC-idle mode is required to send an RRC message in response to an MBMS (Multimedia Broadcast Multicast Service) counting request message received from the base station without establishing an RRC connection;
   the base station transmitting a random access response message to the user equipment; and
   the user equipment transmitting the RRC message to the base station according to the random access response message without establishing the RRC connection.

2. The method of claim 1, further comprising:
   the base station broadcasting the first preamble group and the second preamble group via a system information block type 2 (SIB2).

3. The method of claim 1, further comprising:
   the base station transmitting a contention resolution identity associated with the RRC message to the user equipment; and
   the user equipment determining if a contention resolution is successful based on the contention resolution identity received from the base station.

4. The method of claim 3, further comprising:
   the base station fetching a plurality of bits in the RRC message as the contention resolution identity.

5. The method of claim 3, further comprising:
   the user equipment determining if the at least one single transmission preamble has been transmitted more than a predetermined number of times after determining that the contention resolution is unsuccessful; and
   the user equipment retransmitting the at least one single transmission preamble to the base station after determining that the at least one single transmission preamble has not been transmitted more than the predetermined number of times.

6. The method of claim 5, further comprising:
the user equipment notifying an RRC message transmission failure after determining that the at least one single transmission preamble has been transmitted more than the predetermined number of times.

7. The method of claim 1, wherein the random access response message includes a temporary cell radio network temporary identifier (C-RNTI) and a modulation and coding scheme (MCS) which is allocated to the user equipment based on the at least one single transmission preamble.

8. The method of claim 7, further comprising:
the user equipment monitoring a physical downlink control channel (PDCCH) masked with the temporary C-RNTI after receiving the random access response message.

9. The method of claim 7, further comprising:
the base station transmitting a contention resolution identity associated with the RRC message to the user equipment via a physical downlink control channel (PDCCH) masked with the temporary C-RNTI.

* * * * *